`US009038916B2`

(12) United States Patent
Al-Kadi et al.

(10) Patent No.: US 9,038,916 B2
(45) Date of Patent: May 26, 2015

(54) SMART CARD WITH RECONFIGURABLE RECEIVER

(75) Inventors: Ghiath Al-Kadi, Eindhoven (NL); Massimo Ciacci, 's-Hertogenbosch (NL); Remco Cornelis Herman van de Beek, Eindhoven (NL)

(73) Assignee: NXP, B.V., Eindhoven (NL)

( * ) Notice: Subject to any disclaimer, the term of this patent is extended or adjusted under 35 U.S.C. 154(b) by 71 days.

(21) Appl. No.: 13/252,999

(22) Filed: Oct. 4, 2011

(65) Prior Publication Data

US 2012/0080529 A1   Apr. 5, 2012

(30) Foreign Application Priority Data

Oct. 5, 2010 (EP) .................................... 10186503

(51) Int. Cl.
G06K 19/07 (2006.01)

(52) U.S. Cl.
CPC ............ G06K 19/07 (2013.01); G06K 19/0723 (2013.01)

(58) Field of Classification Search
USPC .......................... 235/492; 370/252; 455/127.5
See application file for complete search history.

(56) References Cited

U.S. PATENT DOCUMENTS

| | | | | |
|---|---|---|---|---|
| 5,363,411 A * | 11/1994 | Furuya et al. ................. 375/316 |
| 5,418,358 A | 5/1995 | Bruhnke et al. |
| 6,978,149 B1 * | 12/2005 | Morelli et al. ................ 455/522 |
| 2003/0058929 A1 * | 3/2003 | Cox et al. ...................... 375/150 |
| 2005/0031021 A1 * | 2/2005 | Baker et al. ................... 375/142 |
| 2006/0022800 A1 * | 2/2006 | Krishna et al. ............... 340/10.2 |
| 2006/0121928 A1 * | 6/2006 | Itsuki ............................ 455/522 |
| 2007/0026893 A1 | 2/2007 | Sakamoto et al. |
| 2007/0158437 A1 | 7/2007 | Koenig et al. |
| 2007/0223626 A1 * | 9/2007 | Waxman ....................... 375/316 |
| 2008/0273480 A1 * | 11/2008 | Chang ........................... 370/311 |
| 2008/0310485 A1 * | 12/2008 | Soliman et al. ............... 375/147 |
| 2009/0022068 A1 * | 1/2009 | Iyer et al. ....................... 370/254 |
| 2009/0048971 A1 * | 2/2009 | Hathaway et al. .............. 705/41 |
| 2011/0280258 A1 * | 11/2011 | Klingen ......................... 370/437 |

FOREIGN PATENT DOCUMENTS

| CN | 2921959 Y | 7/2007 | |
|---|---|---|---|
| WO | WO 2010037416 A1 * | 4/2010 | .............. G01S 5/14 |

OTHER PUBLICATIONS

Extended European Search Report for Patent Appln. No. 10186503.8 (Mar. 18, 2011).

Leti, "Very High Data Rate Radio Frequency Protocol Signal Interface"; VHDR ISO/IEC 14443 Proposal, p. 1-40; 2009.

* cited by examiner

*Primary Examiner* — Thien T Mai
*Assistant Examiner* — Toan Ly

(57) ABSTRACT

The invention proposes a smart card which comprises a digital signal processing receiver that can automatically identify the type of a smart card reader based on the error vector magnitude of signals received from the reader. The digital signal processing receiver is able to reconfigure itself at runtime in order to optimally minimize its power consumption in dependence on the type of reader it is communicating with. Furthermore, the invention proposes a new preamble structure that comprises a basic part and an optional additional part.

4 Claims, 5 Drawing Sheets

SMART CARD WITH RECONFIGURABLE RECEIVER

This application claims the priority under 35 U.S.C. §119 of European patent application no. 10186503.8, filed on Oct. 5, 2010, the contents of which are incorporated by reference herein.

BACKGROUND OF THE INVENTION

VHDR (Very High Data Rate) enabled smart cards are more and more positioned as the next generation of smart cards. New communication protocols between smart cards and smart card readers require a data rate of 1.7 Mb/s up to 13.56 Mb/s while the conventional carrier frequency of 13.56 MHz is still being used. This implies a high increase of Inter Symbol Interferences (ISI). ISI's corrupt the received waveform by interference which depends on the past transmitted symbols. As a result the present symbol is corrupted by the adjacent symbols. Equalization attempts to compensate ISI. On top of ISI, other non-idealities affect the received signal, such as DC offset, gain misadjustment and timing offsets. DC offset occurs when the mean value of the waveform is non-zero, i.e. the waveform is not centered in the available ADC range. Gain misadjustment manifests as an unknown variation of the amplitude of the waveform. Sample timing offset is the phase error between the symbol transitions and the time when the continuous waveform is sampled by the ADC.

In any receiver such non-idealities must be taken into account in order to make a correct detection. Therefore a known sequence (referred to as a preamble) is transmitted before the payload (i.e. the actual data) in order to train the receiver to cope with these non-idealities.

As a consequence, the next generation smart cards will have more integrated digital signal processing (DSP) receivers compared to today's smart cards. Furthermore, the next generation smart cards should be able to communicate with different smart card reader types, for example base stations which are connected to a power supply net and mobile devices which are NFC-enabled.

The power requirements of reader units are completely different depending on the application domain, i.e. the power requirements of a base station are very different from the power requirements of a mobile device. For example, the base station typically provides a clear signal which increases the power consumption at the transmitting side. In other words, in order to generate a clear signal the base station consumes more power. The required power is available because the base station is connected to the power supply net. If the signal is clear, the digital signal processing which takes place at the receiving side, i.e. by the DSP receiver, is relatively simple, and the preamble which is used to synchronize and calibrate the receiver is relatively short.

However, in case of a reader unit comprised in an NFC-enabled mobile device, the available power is limited and therefore the transmitted signal is less clear. In this case the digital signal processing which takes place at the receiving side is relatively complex and the required preamble is relatively long.

The DSP receiver needs to know in advance what kind of preamble it will receive. This results in different preambles in the standards of each type of reader unit. A DSP receiver is typically configured to cope only with a certain kind of preamble and, as a consequence, with a certain type of reader unit. Therefore, the DSP receiver is not very flexible, and the smart card on which it is integrated is limited in its use.

SUMMARY OF THE INVENTION

The digital signal processing receiver is arranged to determine the quality of a signal received from the reader unit by determining the error vector magnitude of this signal. The error vector magnitude (EVM) of the received signal is a good measure of the signal quality. This is directly related to the available bandwidth; a higher bandwidth implies that the reader unit consumes more power to transmit the signal. Thus, if the quality of the signal is higher the conclusion is that the reader unit has more available power to transmit the signal.

According to an aspect of the invention the digital signal processing receiver is further arranged to reconfigure itself in dependence on the quality of the signal received from the reader unit, in order to minimize its power consumption. In short, a certain amount of training can be dispensed with if the quality of the signal is high enough. This is a convenient way to manage the power consumption of the smart card.

According to another aspect of the invention the digital signal processing receiver comprises a power management unit adapted to disable parts of the digital signal processing receiver in dependence on the quality of the signal received from the reader unit. These parts are disabled if the quality of the signal is above a given threshold, for example.

According to a further aspect of the invention the digital signal processing receiver is further arranged to determine whether the reader unit will transmit either a first preamble only, said first preamble comprising a basic training sequence for calibrating one or more signal parameters, or both said first preamble and a second preamble, said second preamble comprising an additional training sequence for calibrating said signal parameters, wherein the digital signal processing receiver concludes that both said first preamble and said second preamble will be transmitted if the error vector magnitude is above a predetermined threshold. This implementation has the advantage that a long preamble for calibration purposes can be avoided in cases where the power budget of the reader unit allows for a high-quality signal.

According to yet a further aspect of the invention, the second preamble is embedded in the payload of a transmitted frame.

According to yet a further aspect of the invention, the signal parameters comprise one or more of the following parameters: DC, gain, and timing.

According to yet a further aspect of the invention, the additional training sequence comprises a white training sequence.

BRIEF DESCRIPTION OF THE DRAWINGS

The invention will be described in more detail with reference to the appended drawings, in which.

DETAILED DESCRIPTION OF EMBODIMENTS

Figure 1:
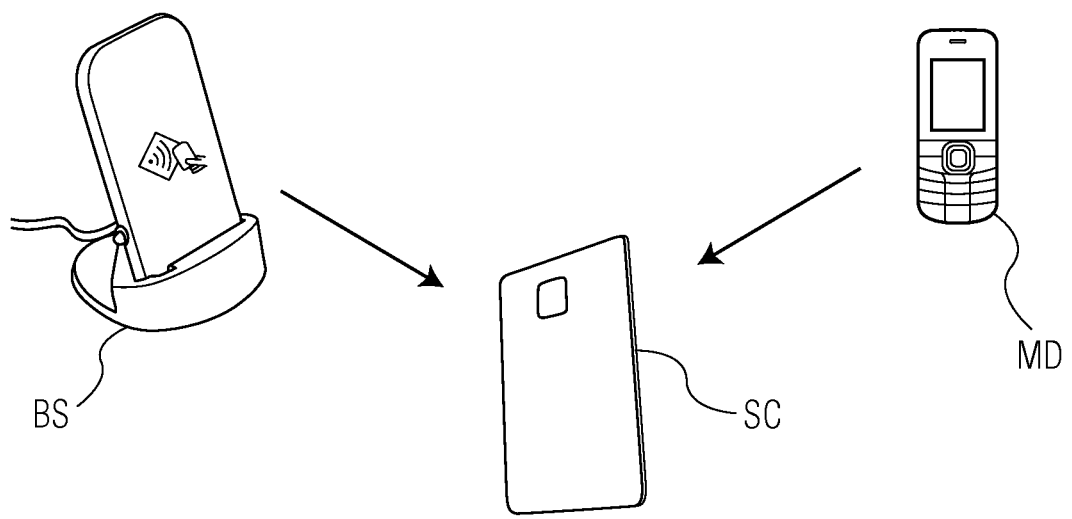
FIG. 1 shows a smart card which communicates either with a reader unit connected to a power supply net or with a reader unit comprised in an NFC-enabled mobile device.

FIG. 1 shows a smart card SC which communicates either with a reader unit BS connected to a power supply net or with a reader unit MD comprised in an NFC-enabled mobile device. As explained above, the power requirements of reader units are completely different depending on the application domain. The digital signal processing receiver comprised in the smart card according to the invention is arranged to determine the quality of a signal received from the reader unit by determining the error vector magnitude of this signal. Techniques for determining the error vector magnitude of a signal are known as such.

Figure 2:
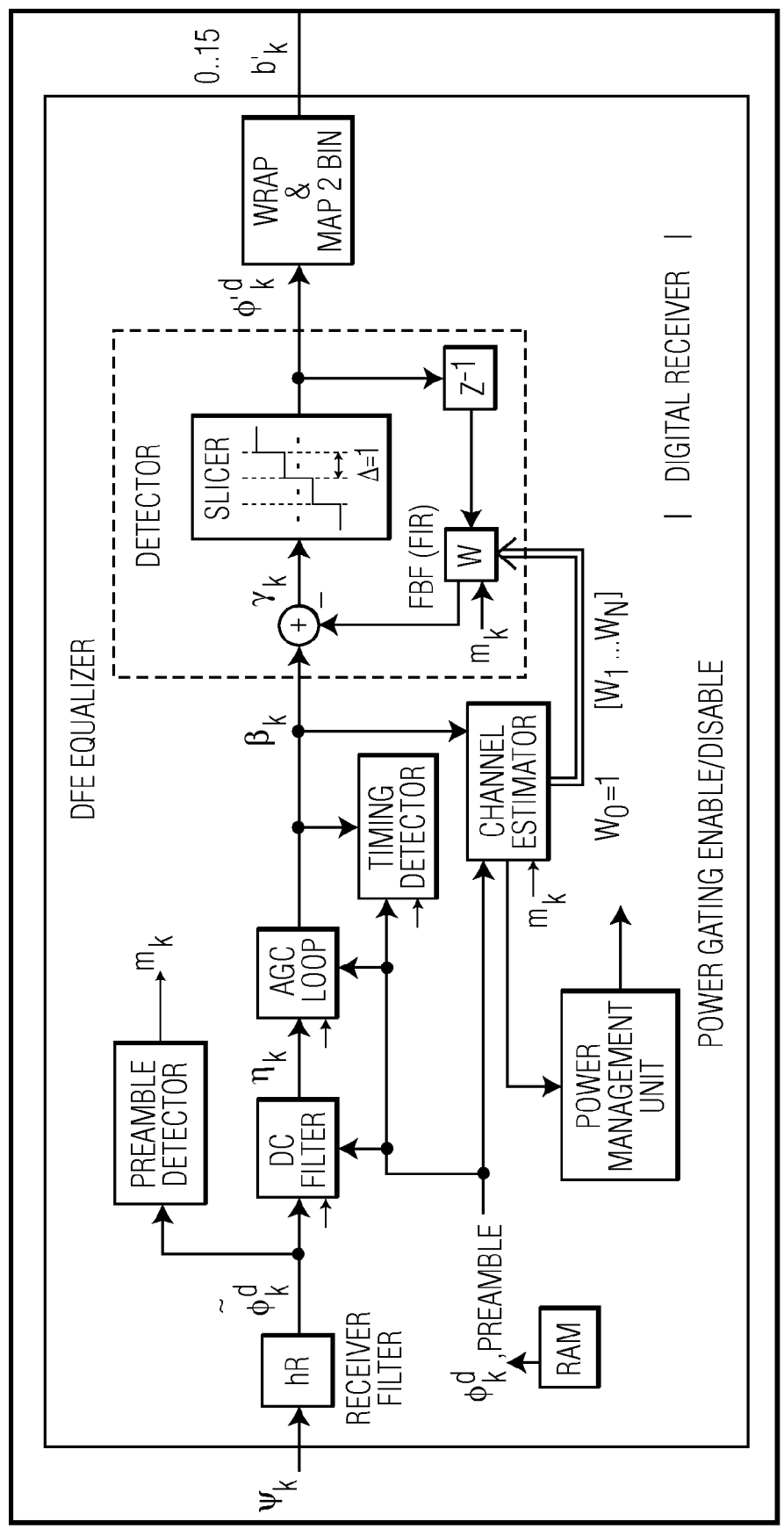
FIG. 2 shows an example of a digital signal processing receiver according to the invention.

FIG. 2 shows an example of a digital signal processing receiver according to the invention. In operation, the digital signal processing receiver uses commonly employed front-end circuits to calibrate signal parameters such as DC, gain and timing. This is achieved during a first preamble which comprises a basic training sequence for calibrating the signal parameters. In parallel a channel estimator is running which determines the type of reader unit. In particular, the channel estimator determines the quality of the signals transmitted by the reader unit.

If the channel estimator determines that the error vector magnitude from the signal received from the reader unit is low enough, for example by comparing it to a predetermined threshold, then it derives that the reader unit has sufficient available power to generate a high-quality signal, and that the reader unit will not send a second preamble with an additional training sequence. In this case the signal is easy to process and extra equalization is not required. The channel estimator sends a signal to the power management unit, and the power management unit will trigger the power-gating and clock-gating circuit in order to disable unnecessary and power-hungry parts of the digital signal processing receiver, such as the equalizer. Thus, the digital signal processing receiver is arranged to reconfigure itself in dependence on the quality of the signal received from the reader unit, in order to minimize its power consumption. In this way the power consumption of the smart card can be reduced.

If the channel estimator determines that the error vector magnitude from the signal is relatively high, then it derives that the reader unit does not have sufficient available power to generate a high-quality signal, and that the reader unit will transmit a second preamble comprising an additional training sequence for accurate calibration of the signal parameters.

Figure 3:
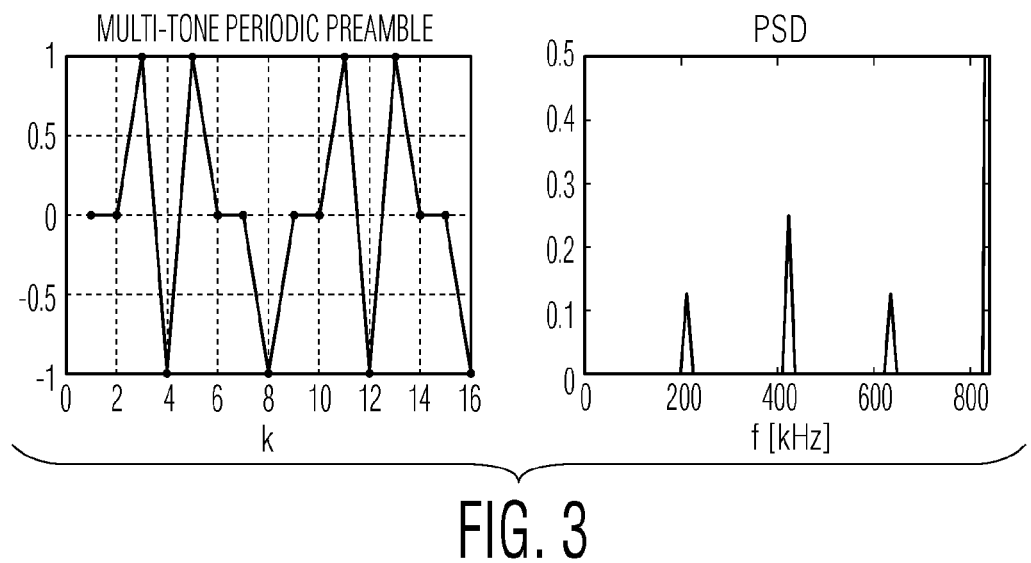
FIG. 3 shows an example of a first preamble according to the invention for multi level modulation.

FIG. 3 shows an example of a first preamble according to the invention, which is a short periodic preamble (for example 24 symbols) that serves for DC, gain and timing adjustment. The left part of FIG. 3 shows the preamble in the time domain and the right part shows the preamble in the frequency domain. During processing of the basic preamble a rough estimate of the channel is performed in addition to the calibration of the signal parameters, and it is determined whether a more accurate channel estimate by means of an additional preamble is needed.

According to an advantageous implementation of the invention, the basic preamble is a multi-tone preamble. A multi-tone preamble is known as such, and it contains enough spectral content to enable a rough but reliable first channel estimate. The multi-tone preamble enables a reliable estimation of the error vector magnitude and a simultaneous calibration of signal parameters such as DC, gain and timing. The second, additional preamble may comprise a white training sequence, for example.

Figure 4:
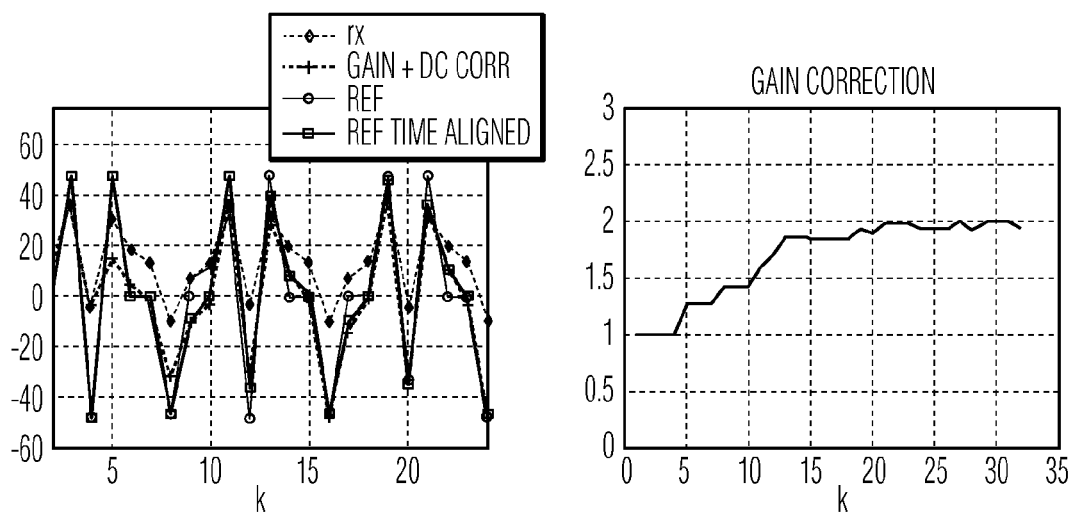
FIG. 4 illustrates how signal parameters are calibrated during the basic preamble.
Figure 5:
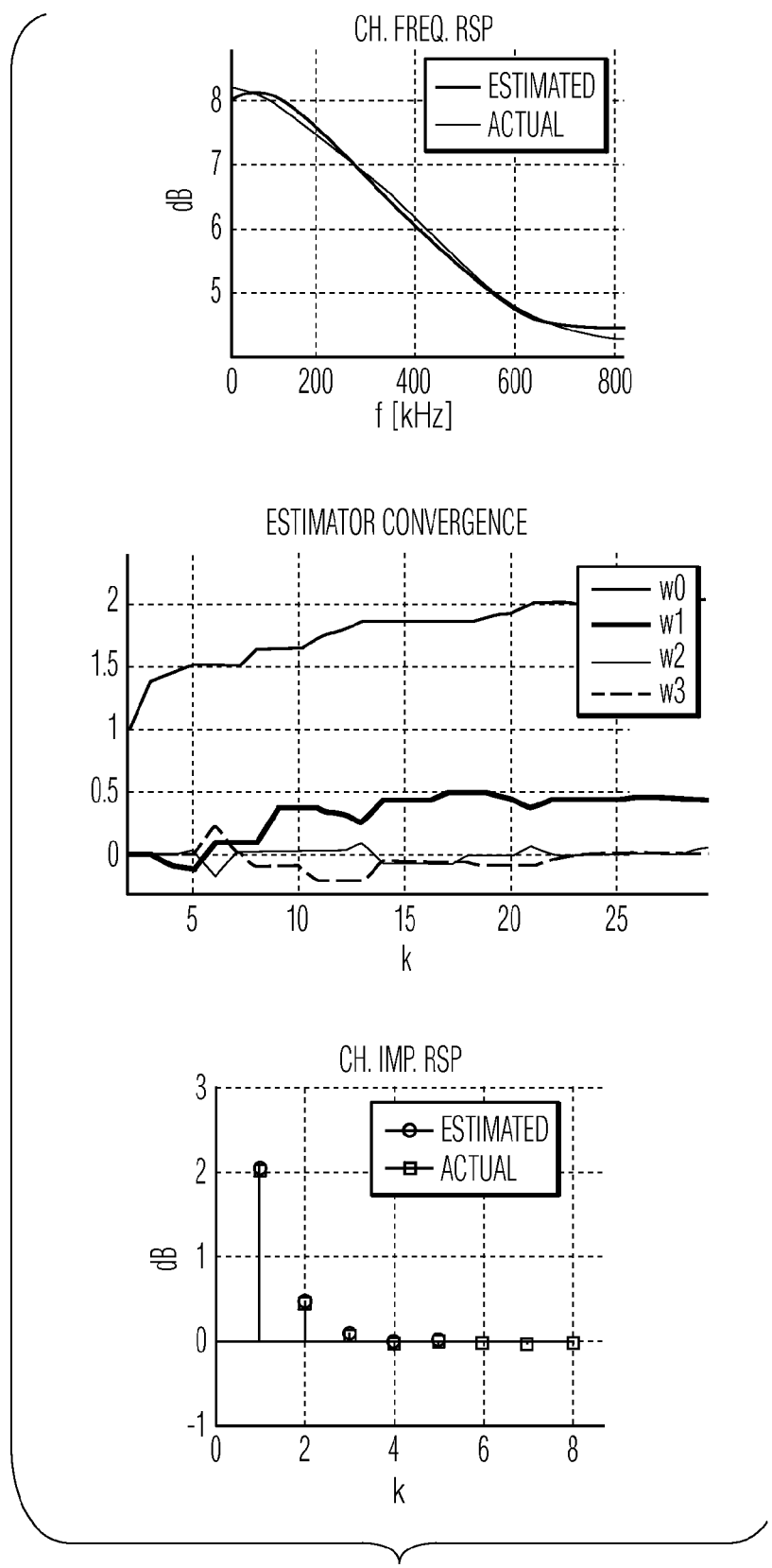
FIG. 5 illustrates how the error vector magnitude of the received signal is determined.
Figure 6:
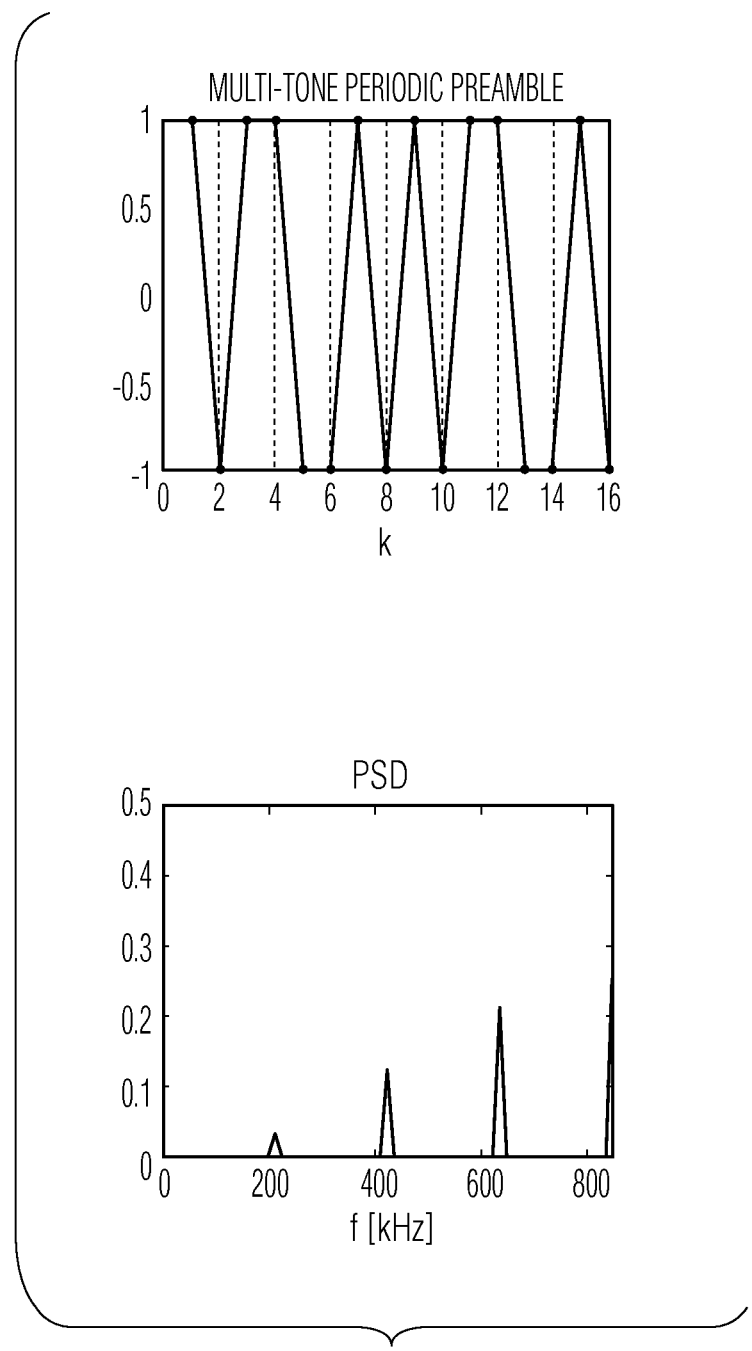
FIG. 6 shows an example of a first preamble according to the invention for two level modulation such as ASK.

FIG. 4 illustrates how signal parameters are calibrated during the basic preamble. FIG. 5 illustrates how the error vector magnitude of the received signal is determined. FIG. 5 shows that within 15 samples it is already known that the error vector magnitude is too high, and that a second preamble is needed which comprises an additional training sequence for accurate calibration of the signal parameters. FIG. 6 shows an example of a first preamble according to the invention for two-level modulation such as ASK (Amplitude-Shift Keying).

The above-mentioned preferred embodiments illustrate rather than limit the invention, and the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. The invention may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A smart card for communicating with an NFC reader unit,
   the smart card comprising a digital signal processing receiver,
   characterized in that the digital signal processing receiver is arranged to determine the quality of a signal received from the NFC reader unit by determining the error vector magnitude of said signal
   wherein the digital signal processing receiver is further arranged to reconfigure itself by shutting down power-hungry parts of itself in dependence on the quality of said signal, in order to minimize its power consumption,
   wherein the digital signal processing receiver comprises a power management unit configured to shut down an equalizer of the digital signal processing receiver if the quality of said signal is above a given threshold;
   wherein the digital signal processing receiver is further arranged to determine whether the NFC reader unit transmits:
   either a first preamble only, said first preamble comprising a basic training sequence for calibrating one or more signal parameters,
   or both said first preamble and a second preamble, said second preamble comprising an additional training sequence for calibrating said signal parameters,
   wherein the digital signal processing receiver concludes that both said first preamble and said second preamble is transmitted if the error vector magnitude is above a predetermined threshold;
   wherein the signal parameters comprise one or more of the following parameters: DC offset, gain misadjustment, and timing offset.

2. A smart card as claimed in claim 1,
   wherein the second preamble is embedded in the payload of a transmitted frame.

3. A smart card as claimed in claim 1, wherein the additional training sequence comprises a white training sequence.

4. A system comprising a smart card as claimed in claim 1 and an NFC reader unit adapted to communicate with said smart card.

* * * * *